Sept. 23, 1930.   H. S. HOLMES ET AL   1,776,587
WELDING MACHINE AND METHOD
Filed Sept. 10, 1924   8 Sheets-Sheet 4
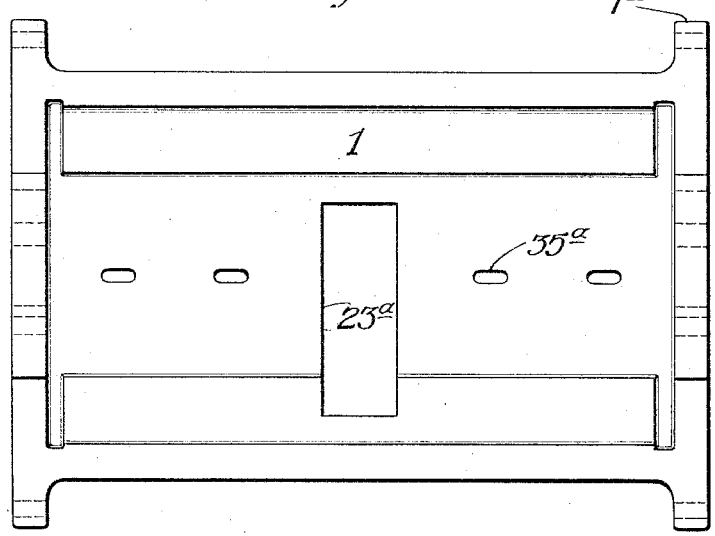
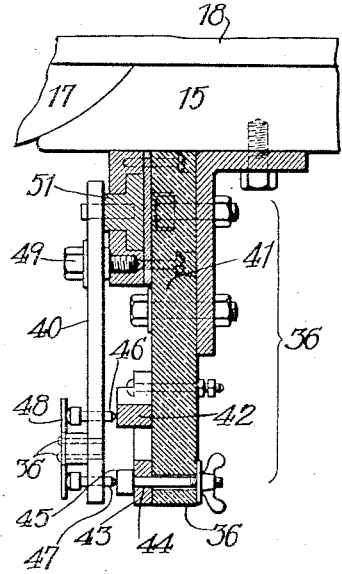
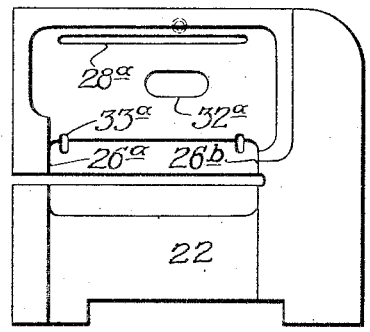
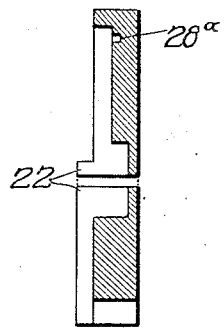
Inventors
HENRY S. HOLMES.
LEROY H. HOFFER.
By their Attorney Sept. 23, 1930.                H. S. HOLMES ET AL                1,776,587
                            WELDING MACHINE AND METHOD
                        Filed Sept. 10, 1924     8 Sheets-Sheet  5

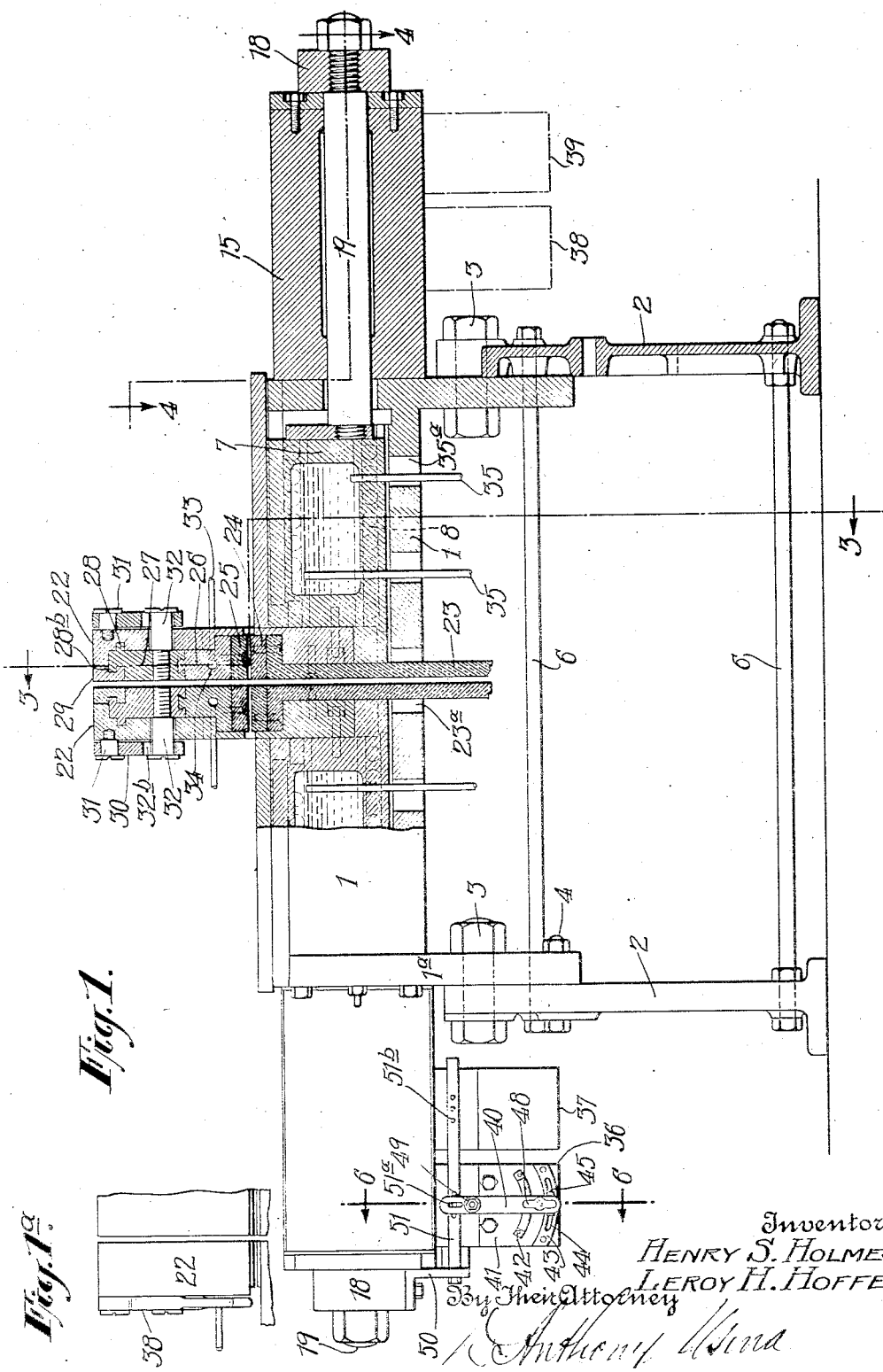

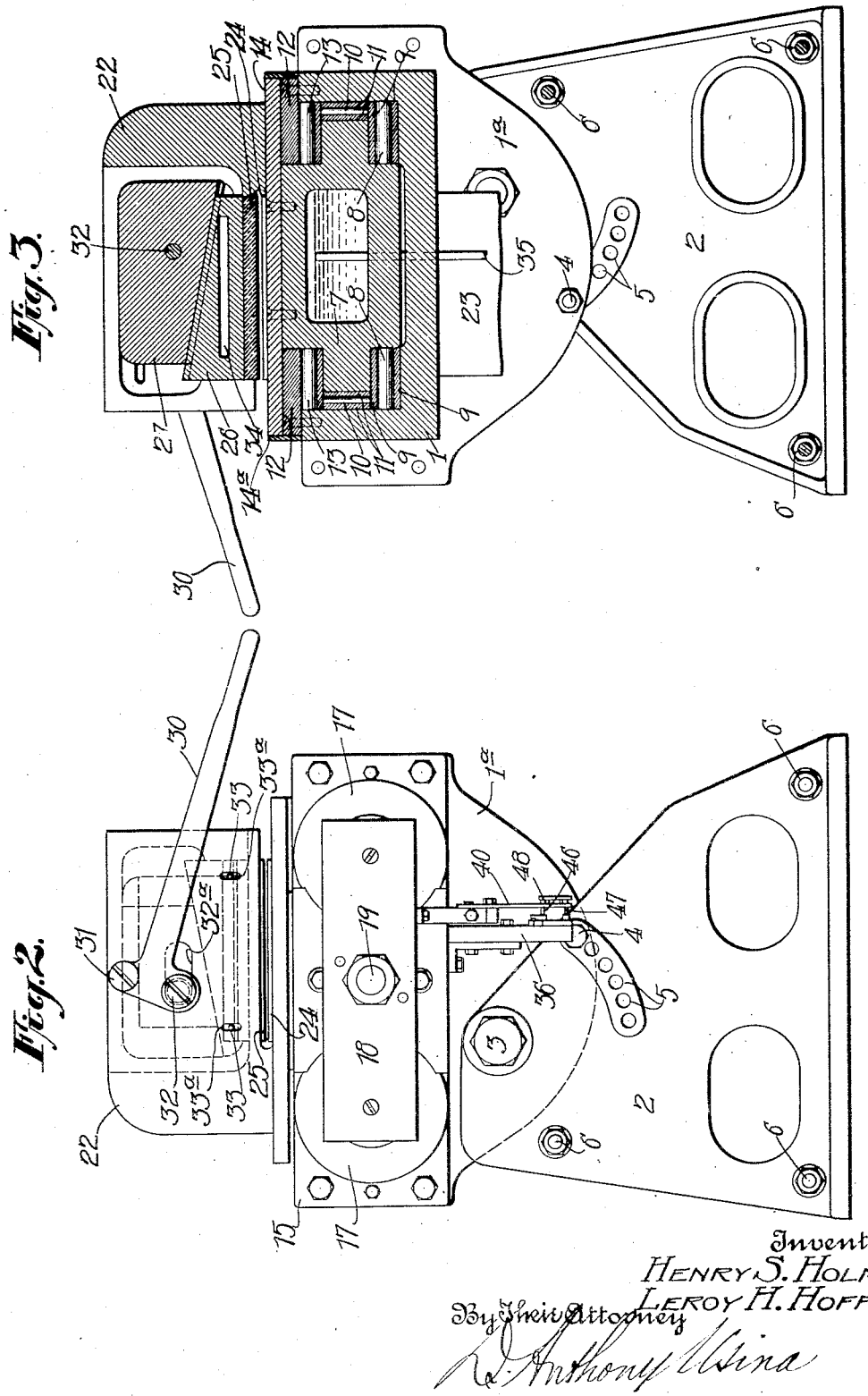

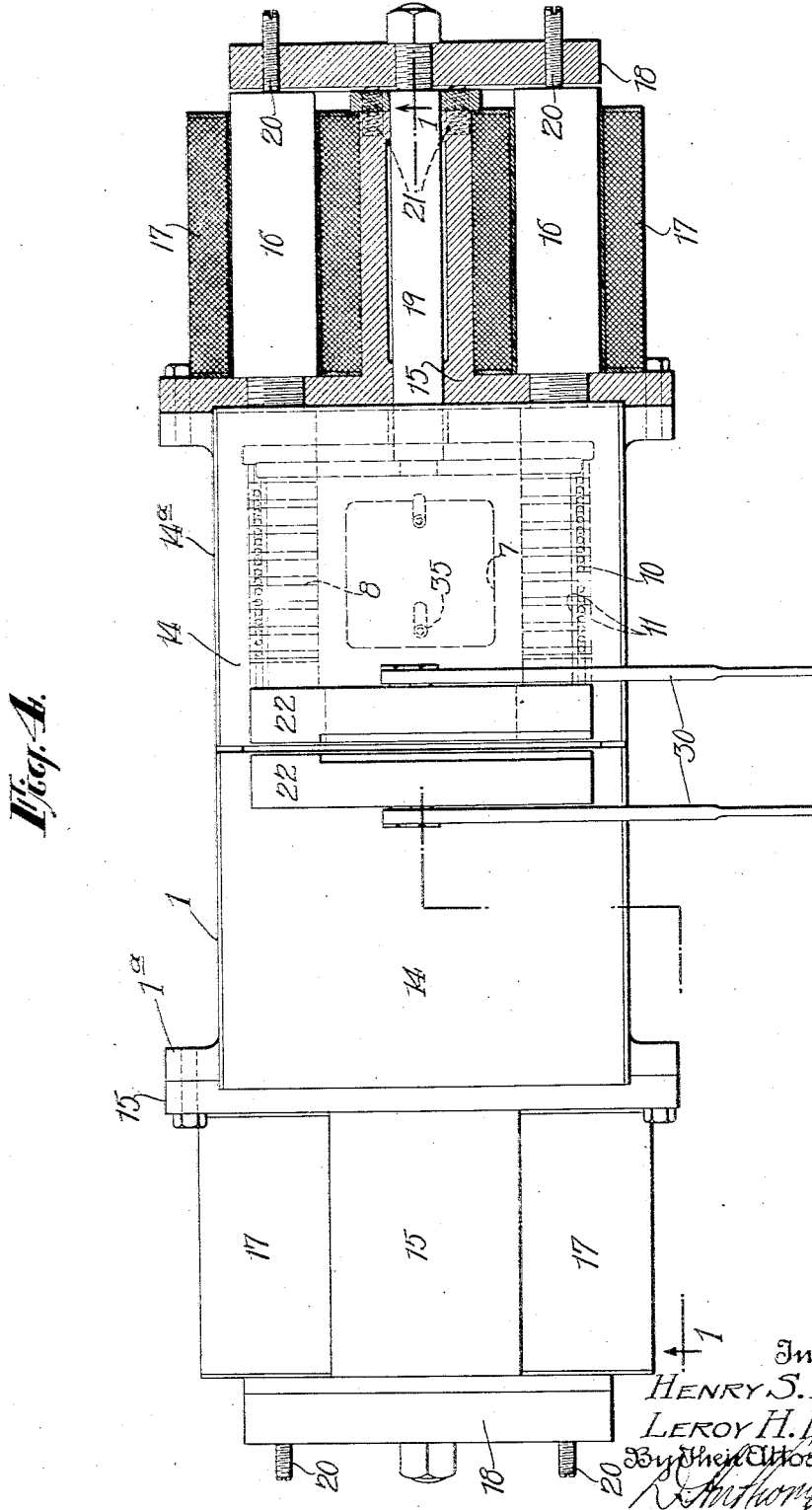

Inventors
HENRY S. HOLMES.
LEROY H. HOFFER.
By their Attorney

Sept. 23, 1930.  H. S. HOLMES ET AL  1,776,587
WELDING MACHINE AND METHOD
Filed Sept. 10, 1924   8 Sheets-Sheet 6

Inventors
HENRY S. HOLMES.
LEROY H. HOFFER.
By their Attorney
Anthony Wina

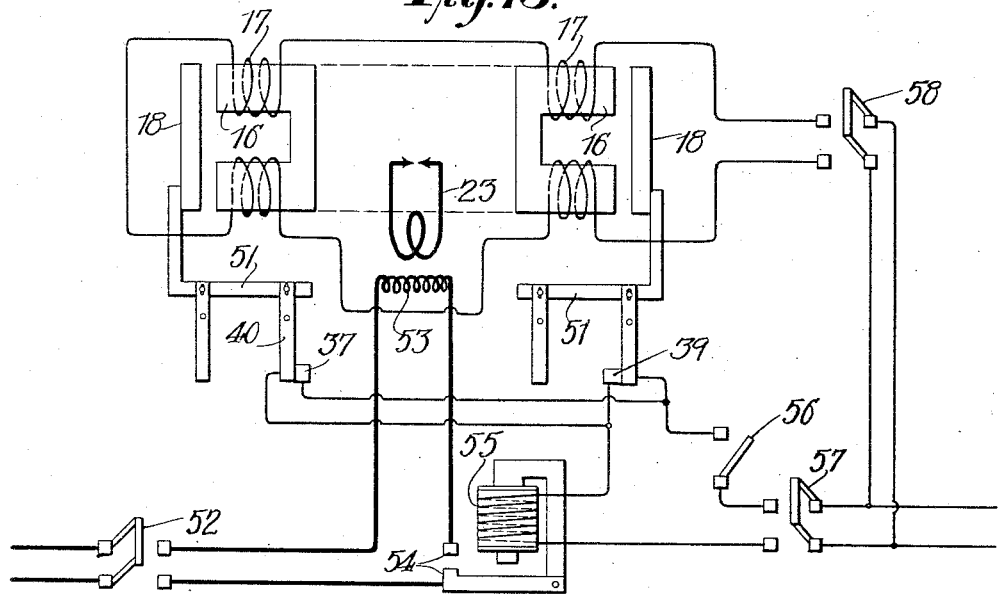
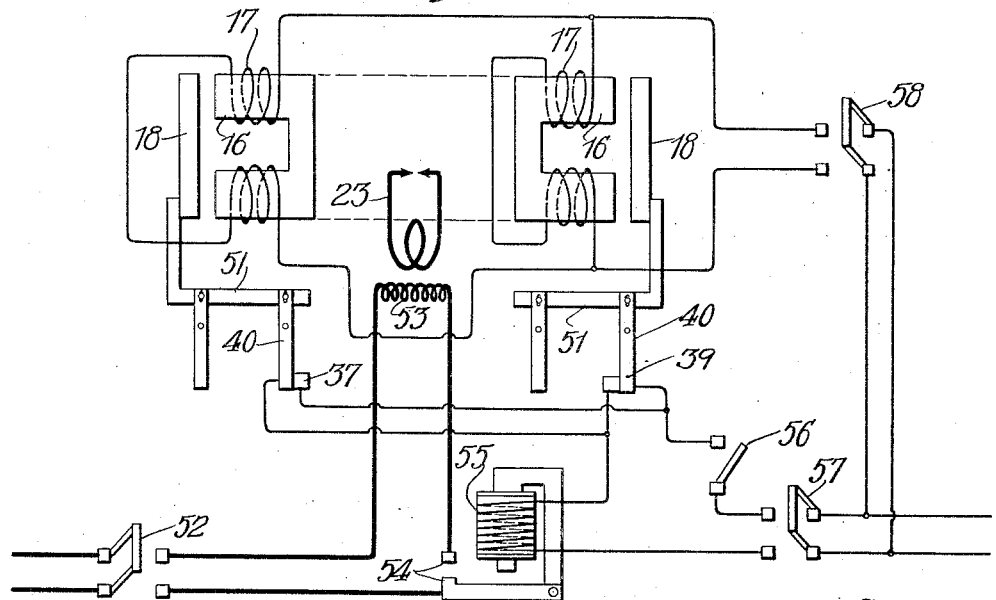

Sept. 23, 1930.   H. S. HOLMES ET AL   1,776,587
WELDING MACHINE AND METHOD
Filed Sept. 10, 1924   8 Sheets-Sheet 8

Inventors
HENRY S. HOLMES
LEROY H. HOFFER.
By Their Attorney
Anthony Usina

Patented Sept. 23, 1930

1,776,587

UNITED STATES PATENT OFFICE

HENRY S. HOLMES, OF NEW YORK, N. Y., AND LE ROY H. HOFFER, OF BROOKLYN, NEW YORK, ASSIGNORS, BY MESNE ASSIGNMENTS, TO METROPOLITAN ENGINEERING COMPANY, A CORPORATION OF NEW YORK

WELDING MACHINE AND METHOD

Application filed September 10, 1924. Serial No. 736,808.

Our invention aims to provide certain improvements in apparatus for electric welding and similar operations and particularly for butt welding sheets or similar parts by the Murray process (Reissue 15,466, October 10, 1922) in which a current of extremely high ampere strength in proportion to the cross-section is applied for a very brief regulated period of time while the parts are pressed together.

The accompanying drawings illustrate such a butt welding machine embodying the invention.

Fig. 1 is a longitudinal section partly in side elevation of the complete machine;

Fig. 1ᵃ is a side elevation of one of the clamping heads;

Fig. 2 is an end elevation of the machine;

Fig. 3 is a section thereof substantially along the line 3—3 of Fig. 1;

Fig. 4 is partly a plan and partly a horizontal section on the line 4—4 of Fig. 1;

Fig. 5 is a plan of the main frame which carries the principal parts of the apparatus;

Fig. 6 is a transverse section on the line 6—6 of Fig. 1;

Fig. 7 is a face elevation and Fig. 8 a cross section of a clamp housing;

Figure 9:
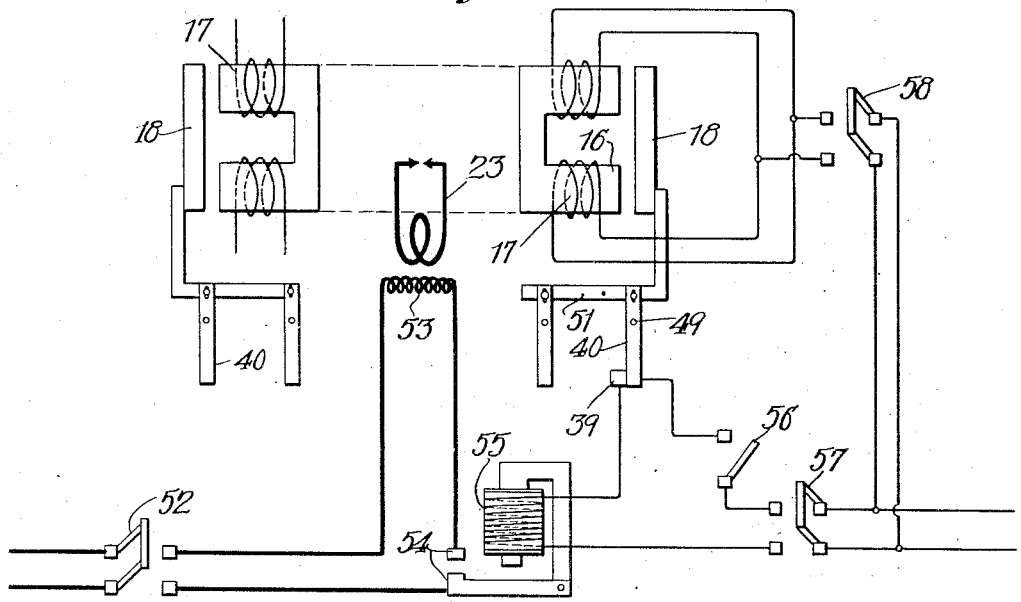

Figs. 9 to 15 inclusive are diagrams indicating different possibilities of the apparatus in the way of electrical circuits so as to get different results.

Referring to the embodiment of the invention illustrated, the main carriage of the apparatus consists of the iron frame 1 open at the top to receive the sliding heads and clamps hereinafter referred to, with side and end walls embracing said parts and with end flanges 1ᵃ to the sides of which are fastened the solenoid frames; these flanges extending downward as in Figs. 1 to 3 and pivotally mounted on the standards 2 by means of bolts 3. Thus the carriage, and all the operative parts of the machine, can be turned to any desired angular position to facilitate insertion and withdrawal of the work. It is held by bolts 4 which may be passed through any of the holes 5 to determine the angle. The standards 2 are tied together by rods 6 to give the machine rigidity.

In the opposite end portions of the carriage 1 are placed sliding heads consisting of hollow iron castings 7 resting on steel rollers 8. (Fig. 3) which roll between hardened steel bearing plates 9. Similar anti-friction bearings are provided at the sides comprising rollers 10 between plates 11 located between the side walls of the carriage 1 and the side faces of the head 7. Also plates 12 are fastened on the upper edges of the sides of the carriage, projecting inward, and rollers 13 are placed between these plates and shoulders on the side portions of the head 7. A top plate 14 is fastened to the head 7 and overhangs the plates 12 and, with side plates 14ᵃ, prevents dirt from getting into the bearings. The head 7 is hollow so that water or other cooling fluid may be circulated through it by means of pipes 35 which pass through slots 35ᵃ in the bottom of the carriage 1.

Each sliding head 7 is reciprocated with a short stroke by means of solenoids carried in an iron frame 15 which is fastened, as above stated, to the side flanges of the carriage 1. Two solenoids are provided for each sliding head comprising coils 17 with cores 16 which are screwed into the inner end of the frame 15. A common armature 18 for the solenoids is mounted on a rod 19, preferably of non-magnetic material, which passes through the frame 15 and is fastened at its inner end to the end of the head 7. The rod 19 is insulated from the sliding head 7, which is also suitably insulated from the carriage 1. The anti-friction bearings carry no part of the welding current, and, therefore, may be made of poor conducting material without chance of overheating, which would distort them and increase the friction. This provision, and the water cooling arrangement, keep the head from substantial distortion and permit it to start promptly and move easily under the pressure of the solenoids. Brass screws 20 are threaded through the armature 18, in order to limit the forward movement thereof, and springs 21 are used to retract it when the current is broken. In order to prevent the freezing of the armature to the cores 16, the screws 20 are slightly advanced, as indicated, to leave a narrow air gap; for example 1/64th of an inch. Without this air gap the residual magnetism in the cores after the current in the solenoid has been discontinued would be so strong that the springs 21 would not be able to reset the electrodes.

The clamps for holding the work are mounted on the inner ends of the sliding heads 7 and reciprocate with the latter. Each clamp comprises an iron or steel housing 22 in the form of an integral block with a gap open at the forward edge for insertion of the work; and within the housing are certain electrodes and clamping means. A flanged copper strip 23 extends almost the full length of the throat and is fastened to the lower part of the housing, its lower end serving as a lead from the secondary coil of a transformer to the lower electrode 24 which is mounted on top of it and projects slightly above the bottom of the gap in the housing. An upper electrode 25 is arranged just above the lower one and the work is clamped between these two electrodes by movement of the upper one. They are in fact two parts of a single clamping electrode embracing the opposite faces of one part of the work and connected through the work-piece to the same lead from the transformer. The similar electrodes in the opposite clamp are connected to the opposite lead of the electrode. When two pieces are held in the respective clamps and advanced edge to edge the current flows across the joint and heats and softens the work so that under the continuous pressure it is taken up until the armatures of the solenoids reach the limit of their advance determined by the screws 20. The leads 23 pass downward through a central slot 23ª in the carriage 1.

The upper electrode 25 for each clamp is secured to the bottom of a steel block 26 which is arranged to slide vertically in a recess in the housing formed by the shoulders 26ª and 26ᵇ Fig. 7. The block 26 has a sliding dove-tailed connection at its upper edge with the lower edge of a wedge 27 which has a key 28 on its rear face engaged in a slot 28ª in the face of the housing, so that the wedge may slide backward and forward and push down the block 26 and the electrode 25 carried thereby. The wedge 27 has also a rib 28ᵇ on its forward face sliding in a longitudinal groove in a plate 29 fastened to the face of the clamp housing to prevent the parts from falling out. A handle 30 is pivotally mounted at 31 on the rear face of the clamp housing and is connected to the wedge 27 by a pin 32 fastened in the wedge and passing through a slot 32ª in the housing and through a slot 32ᵇ (Fig. 1) in the handle. Pipes 33 lead through slots 33ª in the housing to a central chamber 34 in the block 26 so as to permit the circulation of water or other cooling fluid through the same.

The transformer to which the leads 23 are connected may be of any usual or suitable type. We prefer that it be offset as disclosed in Patent No. 1,290,977 so that particles of melted metal will not drop into the windings.

One of the electrodes or clamps may be stationary and the other movable, or both may be movable as in the arrangement illustrated. The welding current and also the current to the pressure magnets may be controlled in various ways according to the character of the work. It is advantageous to commence the actual take-up of the work as soon as the metal is raised to the proper temperature and automatically, that is without external control. For this purpose the apparatus is provided with controlling devices which we may call contactors. To adapt the machine for all cases which may arise, we prefer to provide four such contactors indicated as a whole at 36, 37, 38 and 39. These are secured to the bottom of the magnet frames 15. And the contacts thereon are controlled by means of arms 40 which are moved by the armatures 18 of the solenoids.

The contactor 36 alone is shown in detail; the others being the same or being adjusted to give different modes of operation as hereinafter described. See Figs. 1 and 6. A base 41 of insulating material carries brass segments 42 and 43. The segment 42 is solid, but the segment 43 has a slot 44. A contact block 45 is carried on the face of the segment 43 and carries a bolt extending through the slot 44 and carrying a wing nut on its rear face so that the contact block may be adjusted and clamped in any desired position. Two contact points 46 and 47 are carried in the lower end of the arm 40 and are electrically connected to each other and pressed against the contacts 42 and 45 by means of a short spring 48. According to the position of the contact block 45, the connection with the contact 42 will be made or broken at different positions of the armature of the solenoid.

The arm 40 is pivoted on the block at 49. The armature 18 carries a depending piece 50 which engages the end of a rod 51 arranged to slide on the face of the block 41 and having a pin 51ª which engages a vertical slot in the upper part of the arm 40 so as to produce a movement of the contact point 47 which will be about five times that of the armature. The slide 51 has three tapped holes like 51ᵇ (shown at the right of the slide in Fig. 1) in which a pin 51ª may be set so as to connect it at different points and to cause either a making or a breaking of the circuit with the closing movement of the armature 18.

Different ways in which the circuits can be controlled by these contactors are illustrated in Figs. 9 to 15. They illustrate how the machine may be set to obtain the best welding conditions for any particular job. Various other arrangements are possible, only a few being described.

Fig. 9 illustrates the case in which there is one electrode, the left-hand one, stationary. The two solenoids 16 of the right-hand electrode are connected in parallel. The switch 52 controls the alternating current supply. In series with the primary 53 of the welding transformer, are the contacts 54 which are closed only when the solenoid 55 is energized. The solenoid 55 is in series with a contactor 39 (similar in detail to the contactor 36 above described) and with the hand operated switch 56, and is connected to the direct current supply through a switch 57. The direct current for the pressure magnets is controlled by a switch 58.

In operation the switches 52 and 57 are closed and remain so. The switch 58 is closed to apply the pressure to the pieces to be welded and immediately presses their edges against each other. The hand switch 56 is then closed, which energizes the solenoid 55, closing the contacts 54 and starting the welding current. As soon as the work becomes heated to a suitable temperature it will yield under the continuing pressure of the solenoid and will be quickly taken up to the desired extent. When the desired take-up has been completed, and the armature 18 reaches a predetermined point in its travel, the switch 39 will be automatically opened to open the welding circuit. The switches 56 and 58 will then be opened.

Figure 10:
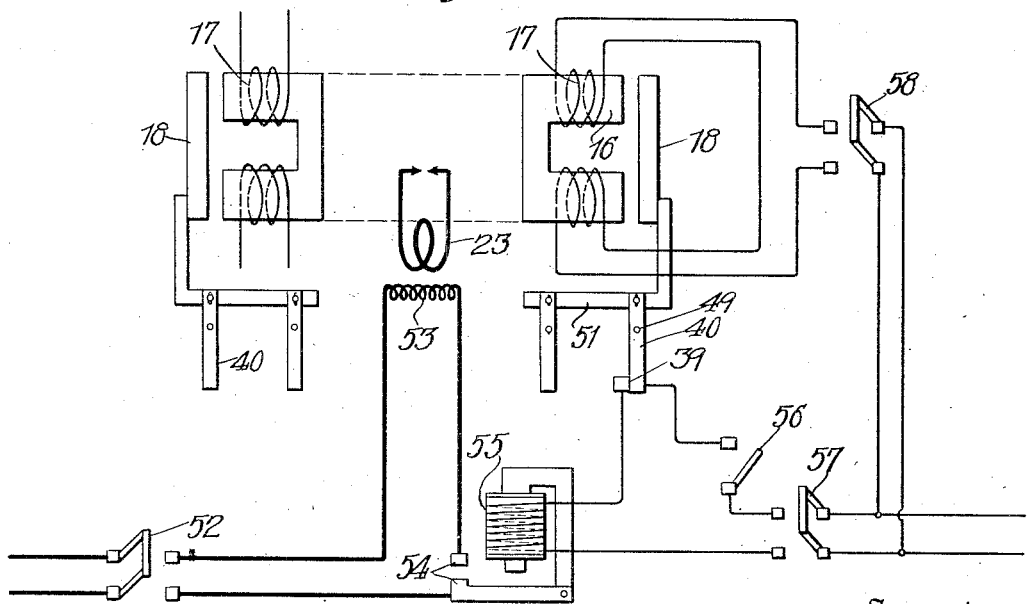

Fig. 10 illustrates a similar control of the welding current. The apparatus in this case, however, has the solenoid coils connected in series with each other. By this arrangement, assuming a constant potential source of direct current, we get a different current value in the solenoids and therefore a different pressure without the use of external resistances. For example, if we have 200 volts on the supply with a resistance of 10 ohms in each solenoid, the parallel arrangement will give us 20 amperes in each solenoid, and the series arrangement would give only 10 amperes through each solenoid, at the same time taking only one half the number of watts from the power source, and saving one half of the power. For the lower amperages in the solenoids, therefore, the series connection is better, and for the higher amperages the parallel connection.

Figure 11:
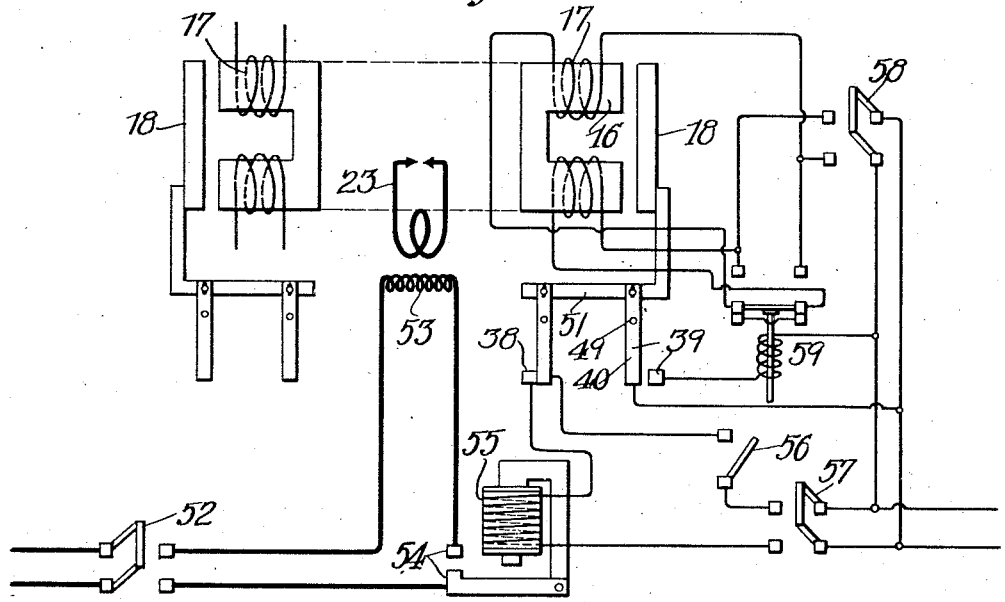

According to Fig. 11, the two solenoid coils 17 are arranged to operate first in series, with comparatively low pressure and then in parallel, with an increased pressure. An additional contactor 59 is introduced into the pressure magnet circuit. This is a double pole, double throw contactor, closed in the top position by a solenoid and in the bottom position by a spring. The contactor 39 is used to control the solenoid of this contactor 59; the contactor 38 being used to control the welding current circuit. The parts are so arranged that after a short movement of the armature 18, the contactor 39 closes, changing the connection of the solenoid coils 17 to a parallel one; and after a short further movement the contact 38 is broken and the welding current cut off from the work.

There is thus an operation in which the welding pressure is slight at first, so as not to take up the metal at a rapid rate until the rough edges of the work have been melted off and a good contact established throughout the entire area at the joint; and in which there is an automatic increase of pressure and of the rate of displacement of the magnet plunger and its electrode, and an automatic increase in the rate of take up in this second stage of the operation. The doing of this automatically is of great importance in the high speed welding contemplated, where the total time of passage of the current is measured in fractions of a second.

Figure 12:
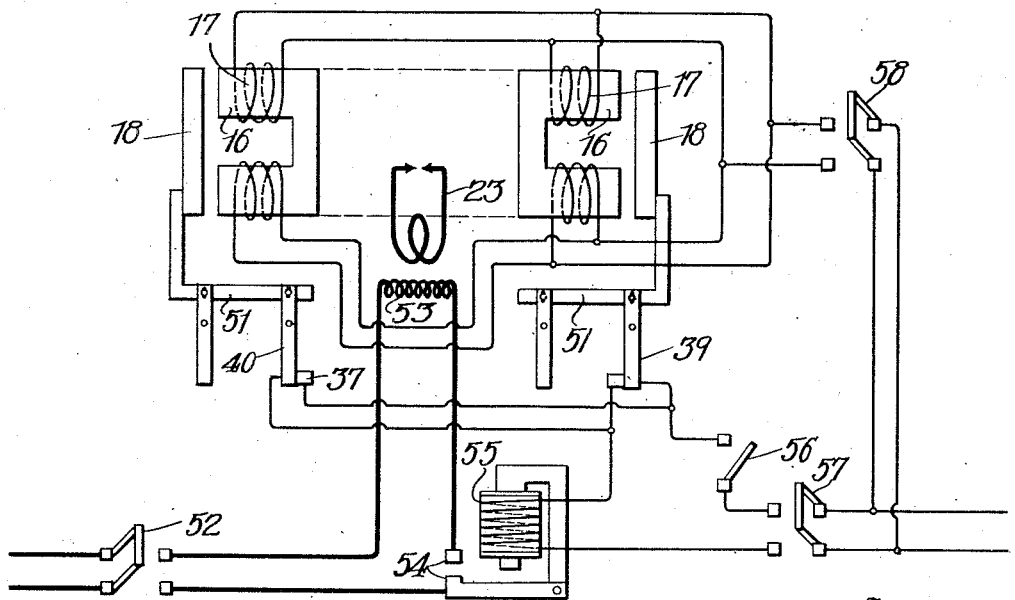

In Fig. 12 both electrodes are movable simultaneously. The pressure solenoids at opposite ends are all in parallel with one another. Contactors 37 and 39 are used. As long as either one of them is closed, the welding current continues. When they are both broken by the completion of the advance of both pressure solenoid armatures, the welding current is cut off.

Fig. 13 illustrates also an arrangement in which both electrodes move simultaneously, but the several pressure solenoids are connected in a single series, giving the minimum pressure and consumption of power. Otherwise the arrangement is as in Fig. 12.

According to Fig. 14 both electrodes are movable simultaneously. The solenoids, however, are in a series-parallel arrangement. The two at the right are in series with each other and the two at the left in series with each other, but those at the right are in parallel with those at the left. This gives a pressure intermediate between those secured by the arrangements of Figs. 12 and 13.

Figure 15:
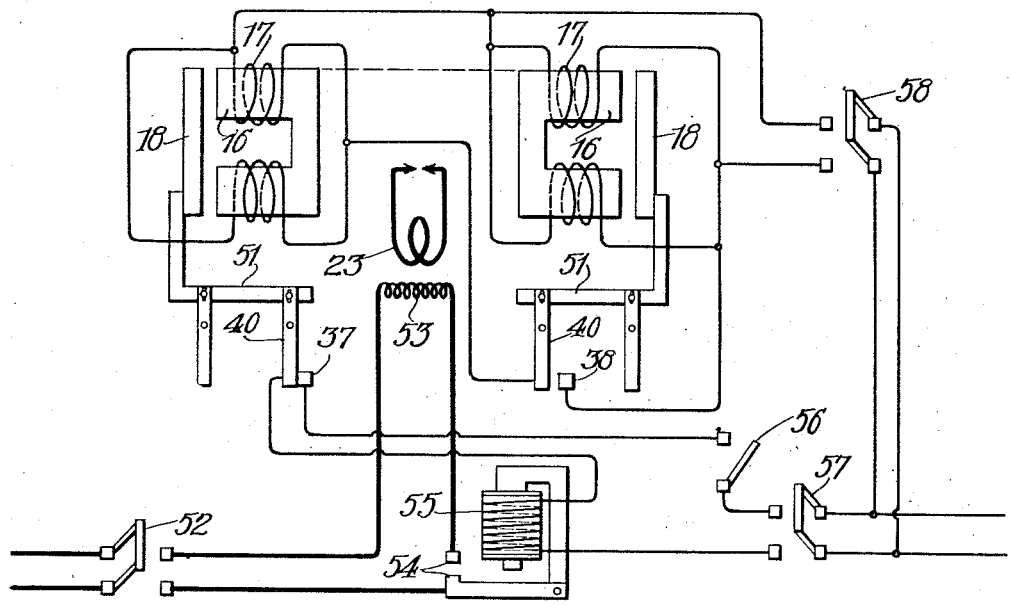

Fig. 15 illustrates the machine set in such a way as to operate the two pressure solenoids consecutively. The coils 17 at the right are in parallel with each other, and similarly at the left. Also the two sets of coils are in parallel one with the other. Thus the highest pressure is obtained. When the switch 58 is closed the pressure magnets at the right are first actuated, the contactor 38 being arranged to hold open the circuit of the pressure solenoids at the left. When the right-hand armature has moved to its limit it closes the contact 38 and energizes the left-hand pressure magnets. At a determined point in the stroke of the latter, the contactor 37 is opened to break the welding circuit.

Movement of one electrode first followed automatically by the movement of the other provides a method of obtaining a varying pressure during the welding operation. For instance, suppose we wish to weld a very thin metal where the pressure necessary for a good weld might be strong enough to buckle the material. We would adjust the current in the first set of solenoids to give a light pressure, strong enough to hold together the pieces to be welded. After any irregularities at the welding edge have been melted off and the entire welding edge has been heated, the armature 18 of this set of solenoids will move until it freezes to the poles 19 (the screws 20 in the solenoid having been backed up to permit this). The contactor connected to the armature will then energize the other set of solenoids which are connected to give a much heavier pressure. The latter solenoids will give a final squeeze to the weld and will also shut off the welding current. The movement of the second pressure solenoids will not back up the first set because it takes many times the original pull of a magnet to release the armature after it has made direct contact with, or is "frozen" to the poles. Where the armature is to touch the poles, it would be advisable to make the switch 58 a double pole, double throw reversing switch; by closing which in either direction the solenoids will be energized. If the armature sticks to the poles when the switch is opened, then the solenoids can be de-energized by closing the switch in the opposite direction for just an instant. This is a common expedient, well known in magnetic chucks and the like.

It is important, particularly in performing the Murray process of electric resistance welding and particularly when welding thin metal sheets (say up to one-eighth of an inch in thickness), to provide means for moving the electrodes or other pressers together in the shortest possible time, and for commencing such movement immediately upon the raising of the work to the proper temperature. In previous welding machines where pressure magnets or equivalent motors have been used, they have had a comparatively long stroke, with devices for transmitting the movement of the motor at a reduced rate to the work. Thus, the take-up on the work has been less than the travel of the moving part of the pressure motor. This has given an increased power. But we have found that it is advantageous to take up the work more rapidly or at a speed at least as rapid as that of the motor. This is accomplished by using high powered electromagnets of the character described connected directly to the moving electrodes. For a take up of one-eighth of an inch, therefore, assuming one clamp to be stationary, the armature of the pressure magnet has to move only one-eighth of an inch, and this it can do in an extremely short period of time. And where there is a double take-up of one-eighth of an inch and both clamps are moved at the same time, the take-up is twice as rapid as the movement of the armatures. With arrangements of this sort, the take-up is effected in less time than with a low powered magnet connected by a speed reducing device to the movable electrode or electrodes. Various other types of take-up motor may be used instead of the solenoids described, the term "motor" being used in its broad sense to include various equivalents of the separate pressure solenoids, or of the combination of opposite solenoids when both heads are to be advanced.

The anti-friction bearings described, for which, of course, various other types of anti-friction bearings might be substituted, also facilitate the quick movement desired and particularly the quick starting of the head; and the artificial cooling of these parts and the disconnection of them from the current serves to save the bearings from getting out of order and thus maintains the rapid operation desired.

The clamping mechanism is arranged to ensure an even contact over the entire surface of the work and at the same time to allow the pieces to be placed in and removed from the clamps in the shortest time and with the least effort.

Though we have described with great particularity of detail certain embodiments of our invention, yet it is not to be understood that the invention is restricted particularly to the embodiments disclosed. Various modifications thereof may be made by those skilled in the art without departure from the invention as defined in the following claims.

What we claim is:

1. An apparatus of the class described having a clamp for holding the work comprising a housing with a gap in it for the work, an electrode in the housing on one side of the gap and a wedge for clamping the work with an even non-sliding contact against the surface of the electrode.

2. An apparatus of the class described having a clamp for holding the work comprising a housing with a gap in it for the work, electrodes on opposite sides of the gap and a wedge for clamping said electrodes against opposite faces of the work with an even contact.

3. In an apparatus for electric welding or the like, the combination of means for passing an electric current and a take-up mechanism having one part to take up the work in one direction and another part to take up work in the opposite direction and means for operating said parts in succession.

4. In an apparatus for electric welding or the like, the combination of means for passing an electric current and a take-up mechanism arranged to take up the work in one direction with a light pressure, means to take up the work in the opposite direction with a heavier presure and means to operate in succession first said light pressure take up mechanism and then said heavier pressure mechanism.

5. In electric butt welding, the method which consists in pressing two pieces of metal in contact together, passing an electric current through the joint and when heated successively advancing the pieces together, one in one direction and the other in the opposite direction.

6. In electric butt welding, the method which consists in passing an electric current through the contacting portions of the two pieces to be welded and, while the current is flowing successively applying electromagnetic forces to press the two pieces together.

7. In an apparatus for high speed electric welding, means for clamping electrodes against the work pieces and take-up mechanism for advancing the electrodes and the work thus clamped together, said take-up mechanism comprising means to directly apply a force undiminished by the speed of movement of the electrodes arranged to move the two work pieces toward each other.

8. In an apparatus for high speed electric welding, means for clamping electrodes against the work pieces and take-up mechanism for advancing the electrodes and the work thus clamped together, said take-up mechanism comprising means to apply electromagnetic force directly and with undiminished speed to move the two work pieces toward each other and insulated anti-friction bearings for the moving parts to facilitate the quick take-up of the work.

9. In an apparatus for electric welding, work holders, one for each work piece, a solenoid for each holder and having a movable part directly connected thereto to move the holder at the same rate as the movable part of the solenoid and means for connecting the solenoids in parallel or in series with each other at will.

10. In an apparatus for electric welding, work holders, one for each work piece, a solenoid for each holder and having a movable part directly connected thereto to move the holder at the same rate as the movable part of the solenoid and means for connecting them in series for part of their movement and in parallel for another part.

11. In an apparatus for electric welding, a take-up mechanism comprising two solenoids adapted to advance the respective work pieces in opposite directions toward each other to take up the work, one of said solenoids exerting greater power than the other and means for energizing in succession the weaker of said solenoids and then the more powerful.

12. A high speed electric butt welding apparatus which comprises holders for objects to be welded, and means for applying electromagnetic force directly to move said holders toward each other with undiminished speed.

13. A high speed electric butt welding apparatus which comprises holders for objects to be welded, a solenoid, an armature for said solenoid movable into the magnetic field of said solenoid, and means for connecting said armature to drive said holders without change of speed or power.

14. An electric butt welding machine which comprises holders for objects to be welded, electro-magnetic solenoids, and an armature positioned to be drawn into the magnetic circuit of said solenoid when the latter is energized and directly connected to one of said holders.

15. A method of welding which comprises pressing together objects to be welded with force, increasing said force independently of the speed of movement of said objects toward each other, and passing an electric current through the abutting surfaces of said objects.

16. In high speed electric butt welding, the method which comprises bringing edges of work pieces to be welded together into abutment, passing a welding current through said abutting edges while imposing an unimpeded force directly on said pieces in a direction to force them toward each other, and increasing said force as said work pieces move toward each other under said force.

In witness whereof, we have hereunto signed our names.

HENRY S. HOLMES.
LE ROY H. HOFFER.